(12) United States Patent
Walker et al.

(10) Patent No.: US 6,836,968 B1
(45) Date of Patent: Jan. 4, 2005

(54) PRECISION FRICTIONLESS FLEXURE BASED LINEAR TRANSLATION MECHANISM INSENSITIVE TO THERMAL AND VIBRATIONAL ENVIRONMENTS

(75) Inventors: Gary R. Walker, Fort Wayne, IN (US); Robert A. Hookman, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/603,087

(22) Filed: Jun. 25, 2003

(51) Int. Cl.[7] .................................................. G01B 5/00
(52) U.S. Cl. .......................................... 33/1 M; 33/568
(58) Field of Search .......................... 33/1 M, 828, 568, 33/787, 573, DIG. 4

(56) References Cited

U.S. PATENT DOCUMENTS

| | | | | |
|---|---|---|---|---|
| 4,635,887 A | * | 1/1987 | Hall et al. .................... | 33/1 M |
| 4,667,415 A | * | 5/1987 | Barsky ......................... | 33/568 |
| 4,888,878 A | * | 12/1989 | Nagasawa et al. ............ | 33/573 |
| 5,129,152 A | * | 7/1992 | Barr ............................. | 33/503 |
| 5,187,876 A | | 2/1993 | Hatheway | |
| 5,400,523 A | | 3/1995 | Hatheway | |
| 6,131,300 A | * | 10/2000 | Mies ............................ | 33/556 |
| 6,246,052 B1 | * | 6/2001 | Cleveland et al. ............ | 33/568 |
| 6,453,566 B1 | * | 9/2002 | Bottinelli et al. ............ | 33/1 M |

OTHER PUBLICATIONS

George H. Neugebauer, Designing Springs for Parallel Motion., Optomechanical Desing, SPIE vol. 770, 1988.
Alson E. Hatheway, Alignment of Flexure Stages for Best Rectilinear Performance, Proceedings of SPIE, vol. 2545, pp. 70–81, 1995.
W.E. Bicknell, et al. GOES High–Resolution Interferometer Study, MIT Lincoln Lab., Project Report NOAA—12, Jun. 1995.
Ellen I. Williams, et al. High–Performance Reactionless Scan Mechamism, 29th Aerospace Mechanism, NASA Conference Publication 3293, pp. 334–349, May 1995.

\* cited by examiner

*Primary Examiner*—Christopher W. Fulton
(74) *Attorney, Agent, or Firm*—Edell, Shapiro & Finnan LLC (57) ABSTRACT

A linear translation device includes a frame, a carriage pivotally coupled to the frame, a drive arm body coupled to the carriage and rotatably coupled to the frame, and an actuator coupled to the drive arm body and the frame to effect rotation of the drive arm body about a pivot point. The device effects linear motion to the carriage by rotating the drive arm body by the actuator about the pivot point. An object, such as an optical component, is secured to the carriage such that linear motion of the carriage conveys linear motion to the object. Each of the frame, carriage and drive arm body are preferably coupled to each other with flexures to facilitate substantially frictionless linear translation of motion to the carriage and object secured to the carriage when the drive arm body is rotated by the actuator.

27 Claims, 7 Drawing Sheets

PRECISION FRICTIONLESS FLEXURE BASED LINEAR TRANSLATION MECHANISM INSENSITIVE TO THERMAL AND VIBRATIONAL ENVIRONMENTS

GOVERNMENT INTERESTS

This invention was made with Government support and the Government may have certain rights in the invention.

BACKGROUND OF THE INVENTION

1. Field of the Invention

The present invention relates to a mount for translating linear motion to an object, such as an optical component.

2. Description of the Related Art

Precision linear motion translation devices have become important in recent years, particularly in aerospace and semiconductor industries, for translating or conveying rectilinear motion to an object. In particular, parallel motion mechanisms employing parallel flexure linkages are useful for translating a frictionless linear motion to an object of interest. Such parallel motion mechanisms are typically referred to as "porch swing" mechanisms, because the rectilinear movement that is translated to the object during operation of these mechanisms resembles the linear movement of a glider type porch swing.

Figure 1:
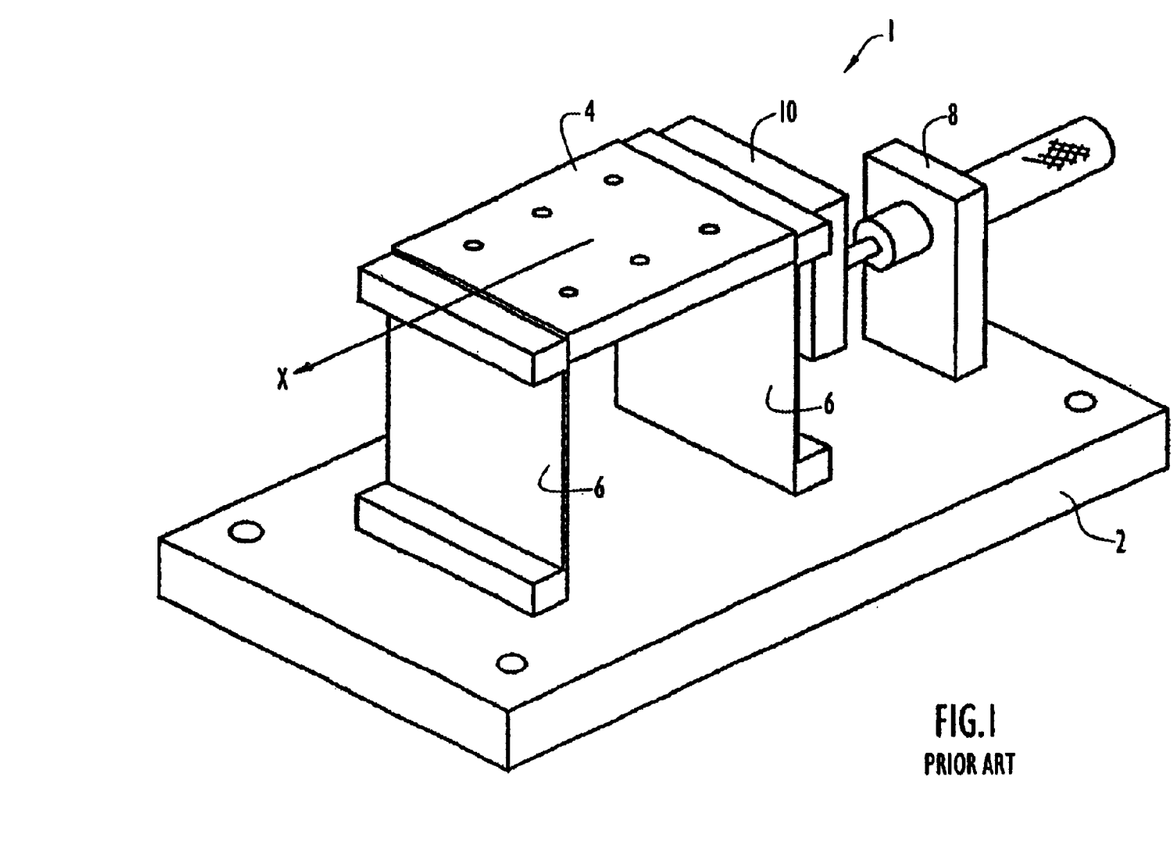
FIG. 1 is a view in perspective of a simple linear translation device that is known in the art.
Figure 2:
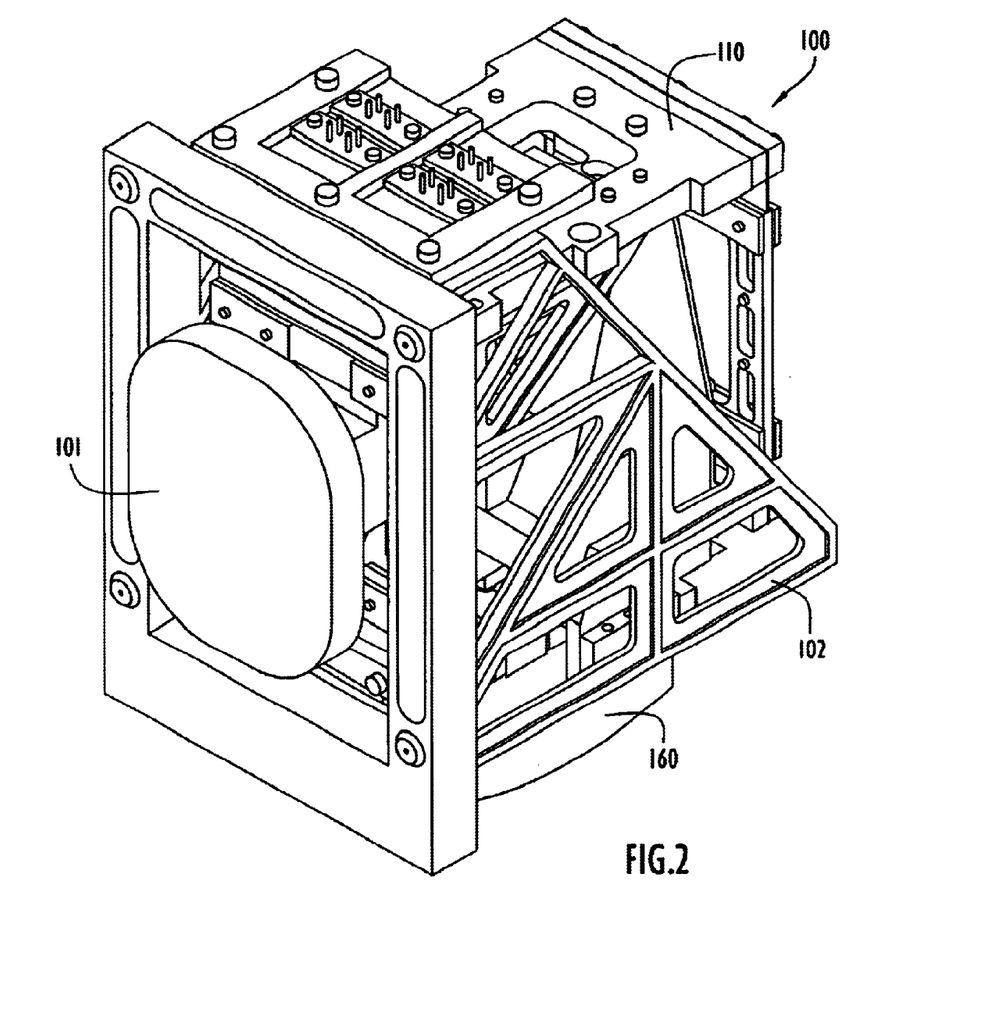
FIG. 2 is a view in perspective of a linear translation device for an optical component in accordance with the present invention.

A simple linear motion device employing parallel flexure linkages is depicted in FIG. 1. In particular, device 1 includes a support or base plate 2, and a carriage 4 separated at a selected distance from and secured to the base plate via a pair of flexure blades 6. Flexure blades 6 are disposed at the longitudinal ends of the carriage in parallel alignment with each other and pivot at their attachment points with the carriage. A driving device 8 (e.g., a micrometer head) is secured to the base plate and engages the carriage at one of its longitudinal ends, via a plate 10, to effect rectilinear movement of the carriage along an axis X when the driving device is moved in that direction. Movement of the driving device forces parallel flexing of the flexure blades to displace the carriage a desired distance along the X axis while minimizing or preventing rotational movements of the carriage about the X axis as well as other axes transverse to the X axis.

Flexure based rectilinear movement mechanisms of the parallel flexure or "porch swing" type have been designed for use in optical instruments such as interferometers. The flexure blade linkages of such mechanisms are particularly suitable for use in optical instruments associated with aerospace applications because they extend the operational life of the mechanism in comparison to mechanical linkages required to perform the same movements.

However, attempts at employing a linear translation porch swing device for optical instruments utilized in space flight applications has met with limited success due to the many difficult challenges and requirements associated with such applications. For example, issues such as mass, size and robustness of the device, power requirements for generating precision movements of the device, and the ability of the device to perform with precision for extended periods of time (e.g., at least ten to fifteen years of a space flight) are important considerations in aerospace applications. Other issues that are important to consider in designing a linear translation device for aerospace applications are the sensitivity and operability of the device to large temperature fluctuations, sensitivity of the device to shock and external vibrations (e.g., during launch conditions in a space shuttle), sensitivity of the device to gravity orientation, and any adjustments required of the device to achieve high precision performance.

Thus, there exists a need to provide a precision frictionless linear translation device that performs well under the conditions encountered in aerospace as noted above, minimizes the energy requirements associated with operation of the device and is suitably dimensioned and of a suitable weight to satisfy space flight requirements.

OBJECTS AND SUMMARY OF THE INVENTION

Therefore, in light of the above, and for other reasons that become apparent when the invention is described, an object of the present invention is to provide a frictionless linear translation device that is useful for translating linear movement to an object.

Another object of the present invention is to provide a frictionless linear translation device that conveys linear motion to an object or component with a high degree of precision.

A further object of the present invention is to provide a frictionless linear translation device that can withstand the thermal and vibrational conditions associated with aerospace and other applications while ensuring a high degree of precision during performance of the device.

Yet another object of the present invention is to provide a frictionless linear translation device that has a suitable weight and suitable dimensions for space flight applications.

The aforesaid objects are achieved individually and in combination, and it is not intended that the present invention be construed as requiring two or more of the objects to be combined unless expressly required by the claims attached hereto.

In accordance with the present invention, a linear translation device includes a frame, a carriage pivotally coupled to the frame, a drive arm body coupled to the carriage and rotatably coupled to the frame, and an actuator coupled to the drive arm body and the frame to effect rotation of the drive arm body about a pivot point. The device effects linear motion to the carriage by rotating the drive arm body by the actuator about the pivot point. An object, such as an optical component, is secured to the carriage such that linear motion of the carriage conveys linear motion to the object. Each of the frame, carriage and drive arm body are preferably coupled to each other with flexures to facilitate substantially frictionless linear translation of motion to the carriage and object secured to the carriage when the drive arm body is rotated by the actuator.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

DETAILED DESCRIPTION OF THE PREFERRED EMBODIMENTS

In accordance with certain aspects of the present invention, a linear translation device for translating rectilinear motion to an object or component secured to the device is illustrated in FIGS. 2–6. In particular, the linear translation device depicted in the figures is mounted within the housing of an optical instrument (e.g., a Michelson type interferometer) for translating linear motion to an optical component (e.g., a mirror) as described below. However, it is noted that the device may be configured for use with any instrument or other device that requires precise positioning of a particular component during operation of the device.

Referring to FIGS. 2–5, device 100 includes a frame 102 that is secured to a suitable support structure within the housing of the optical instrument, a carriage assembly 110 secured to the support frame via primary flexures 112, a drive arm assembly 120 and rotary actuator 160 to drive the carriage assembly during operation of the device as described below. The carriage assembly includes a securing section at its front end to attach and support an optical component 101 (e.g., a mirror). As used herein, the term "flexure" refers to a linking structure that is secured to at least two parts or components of the device and includes at least one flexible element that is resiliently flexible or bendable so as to permit movement of at least one component with respect to the other component(s) to which the linking structure is secured.

The components of the device may be constructed of any suitable materials that satisfy weight requirements, durability and other specifications required for a particular application. Preferably, for aerospace and other applications, the components of the device are constructed of materials having substantially equal coefficients of thermal expansion (CTE), such as beryllium, stainless steel, and titanium alloys. Most preferably, the flexures of the device are constructed of 17-7 CH900 stainless steel and/or 17-4 PH stainless steel to provide suitable resiliency and durability for the flexures and enhance performance of the device.

Frame 102 includes a generally rectangular front plate 104 including a central open section suitably dimensioned to permit movement of optical component 101 and/or portions of the carriage assembly through this open section during operation of the device. A generally rectangular base plate 106 extends from a lower end of front plate 104 in substantially perpendicular alignment with the front plate. The base plate includes a central open section to permit portions of the drive arm assembly and/or the rotary actuator to extend through this open section. Supporting sidewalls 108, each having a generally triangular configuration with a truncated top surface, extend from opposing side edges of front plate 104 to base plate 106. The sidewalls preferably include a series of channeled sections with open sections extending through the sidewalls so as to reduce the weight of the sidewalls while providing support and structural integrity to the frame. A top plate 109 extends from an upper edge of front plate 104 toward the rear portion of the frame. The top plate is substantially perpendicular with the front plate and extends a slight distance beyond the truncated top surface edges of sidewalls 108.

Figure 5:
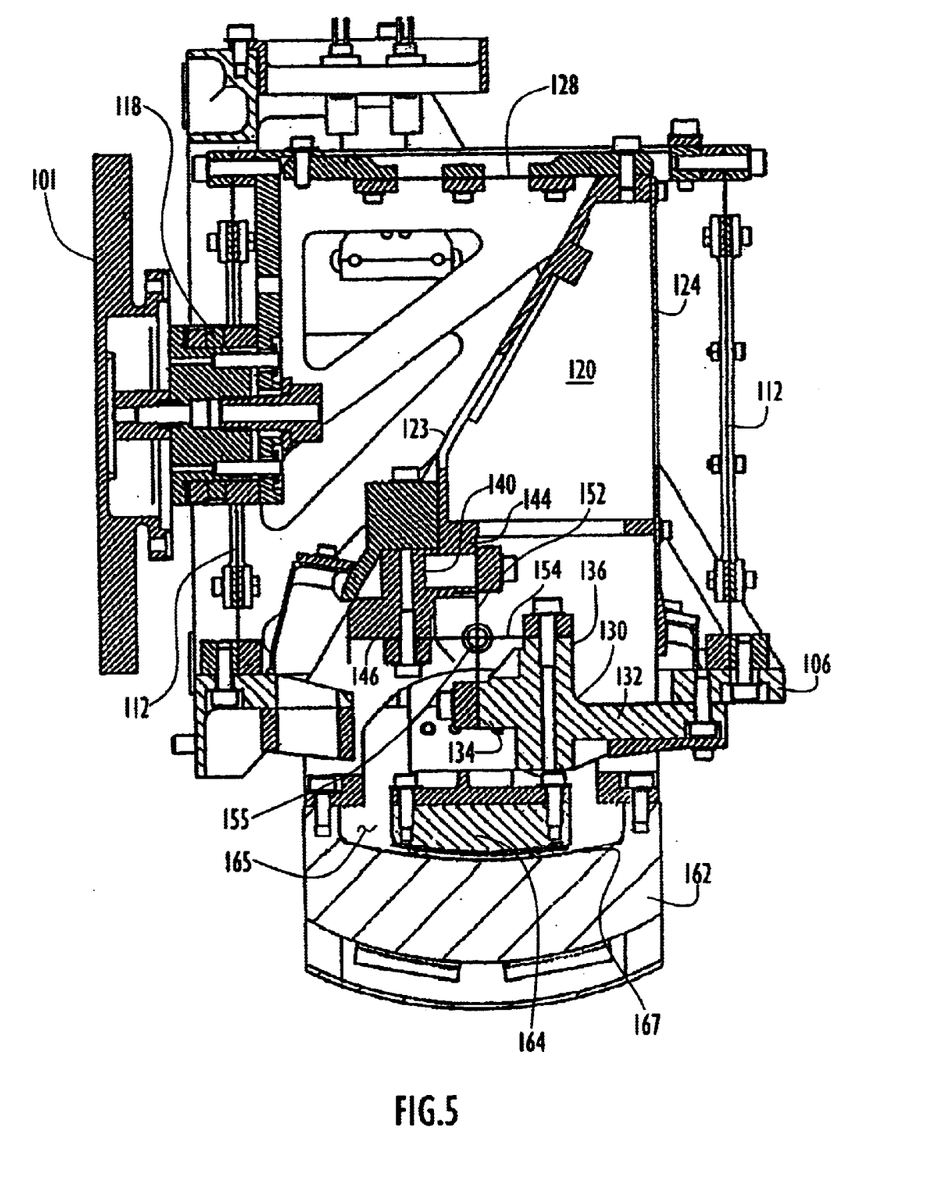
FIG. 5 is a side view in cross-section of the device of FIG. 2.

Carriage assembly 110 includes a generally rectangular carriage 114 with a central open section defined therein. Two generally rectangular and resilient primary flexures 112 are connected to and extend from the longitudinal edges of the carriage. The primary flexures extend toward and are secured to an upper surface of the frame base plate at a location near its longitudinal edges. When the carriage assembly is at rest with respect to the frame, the primary flexures are substantially parallel with each other. The primary flexures are thin plates constructed of suitable materials and have suitable dimensions, as described below, so as to flex and permit a substantial linear movement of the carriage in response to forces applied to the carriage by the drive arm assembly. Each primary flexure further includes a central open section to reduce the weight of the flexure and to permit other components of the device to extend through one or both of the flexures. Referring to FIG. 5, a mirror support structure 118 (e.g., a bracket) extends from a lower surface of the carriage near the front end of the device (i.e., the end including the optical component) and through the open section of the front end primary flexure to connect with and secure optical component 101 to the carriage.

Figure 3:
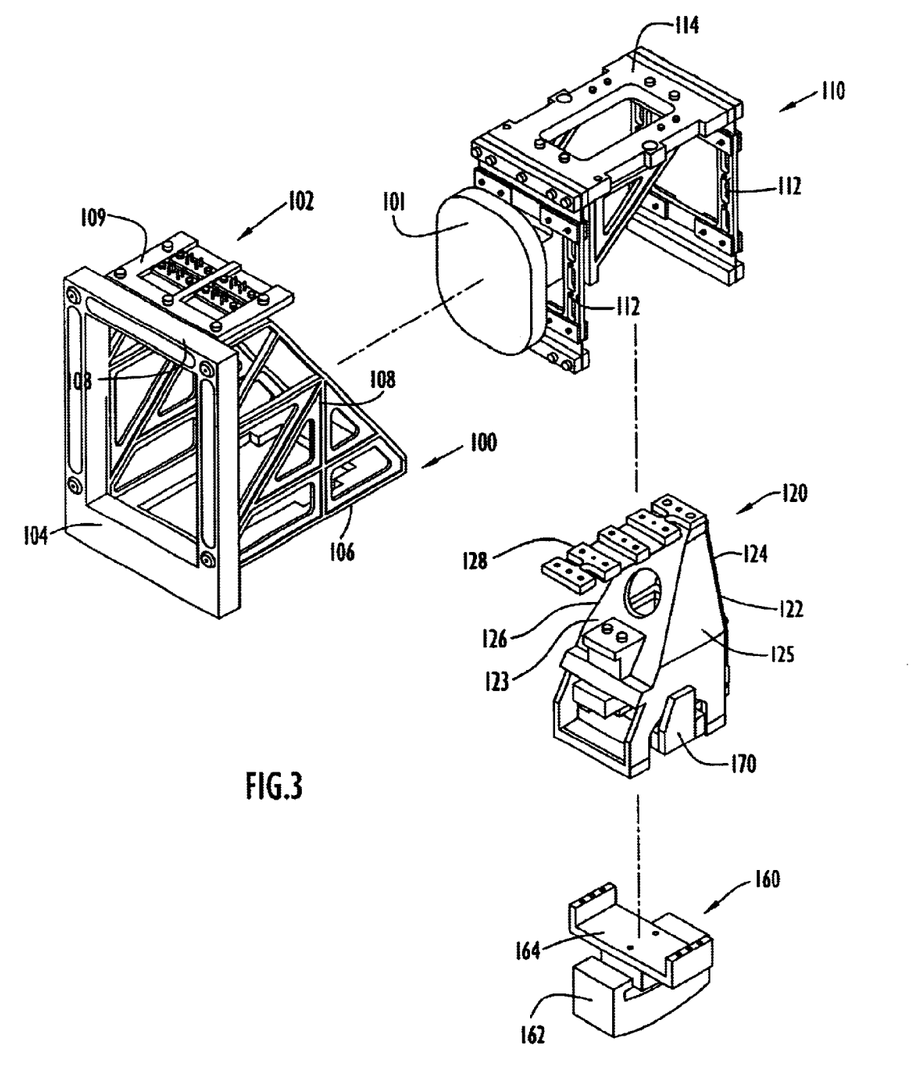
FIG. 3 is an exploded view in perspective of the device of FIG. 2.
Figure 4:
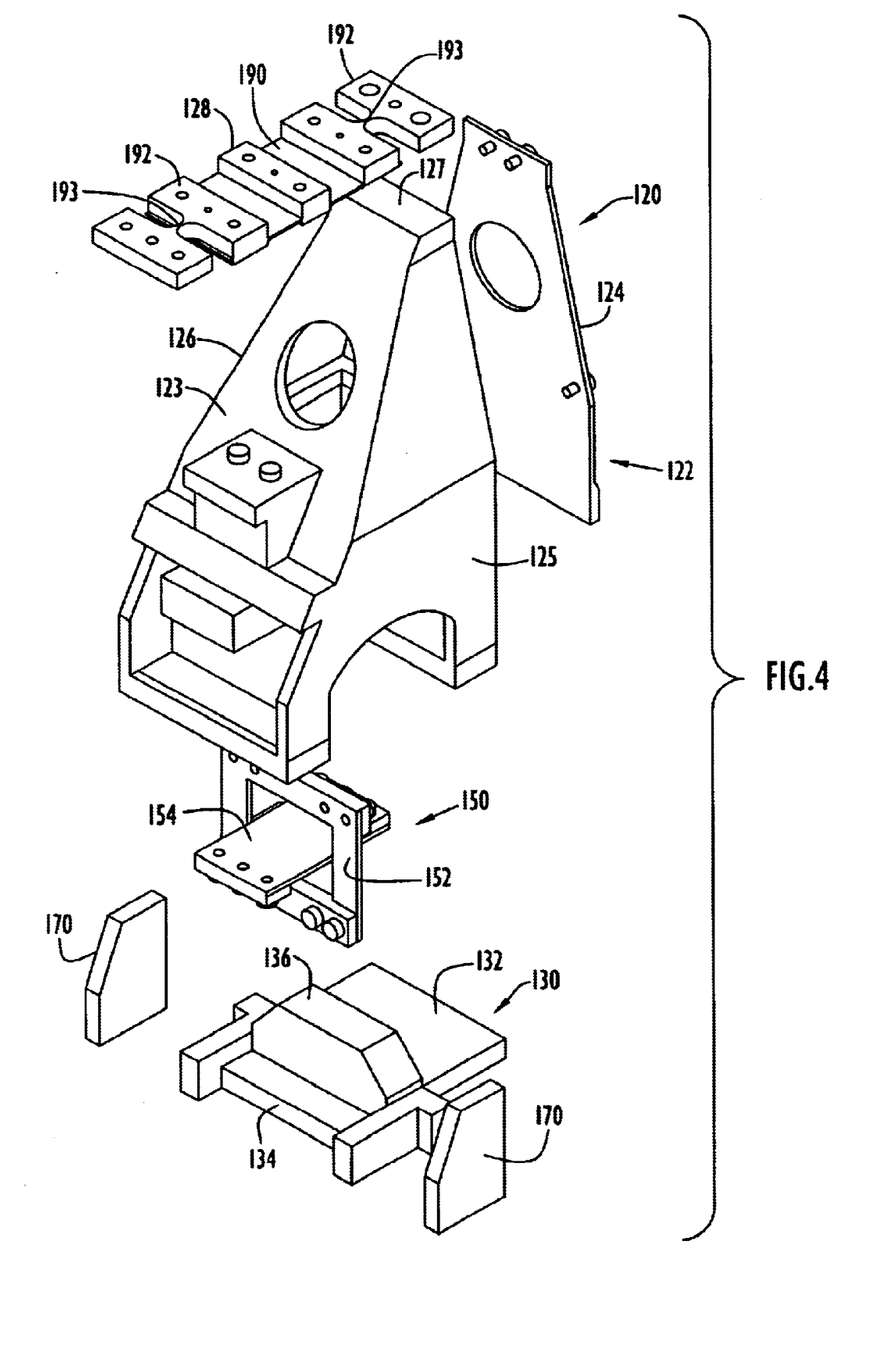
FIG. 4 is an exploded view in perspective of the drive arm assembly for the device of FIG. 2.

Referring to FIGS. 3–5, drive arm assembly 120 includes an elongated and hollow drive arm body 122 with opposing front and rear wall sections 123, 124 and opposing sidewall sections 125, 126, where the width of each front, rear and sidewall section decreases in dimension from a lower or base portion to an upper portion of the wall section. Front wall section 123 includes a lower first portion that extends in a generally parallel alignment with rear wall section 124 and an upper second portion that angles toward the rear wall section. Sidewall sections 125 and 126 include lower portions that are generally parallel with each other and upper portions that angle toward each other. Thus, the internal volume within the upper portion of the drive arm body, as defined by the space between the front, rear and sidewall sections, is less than the internal volume within the lower or base portion of the drive arm body. The front, rear and sidewall sections each extend to a generally rectangular top wall section 127. The drive arm body is open at its base portion, and further includes open sections defined in each of the lower ends of the front, rear wall and sidewall sections. In addition, the bottom surface edges at the front and rear of the drive arm body are suitably dimensioned to secure portions of rotary actuator assembly 160 to the drive arm body as described below.

A thin, rectangular drive link flexure 128 connects the drive arm body to a lower surface of the carriage. Specifically, a first longitudinal end of drive link flexure 128 is secured to top wall section 127 of the drive arm body such that the drive link flexure extends from the drive arm body toward front plate 104 of frame 102 when the drive arm body is secured within the frame. An opposing, second longitudinal end of the drive link flexure is secured to a lower surface of carriage 114 at a location proximate support structure 118 for the optical component. When secured to the carriage within the frame via the drive link flexure, the base portion of the drive arm body extends slightly through the open section of the frame base plate.

Drive arm assembly 120 further includes mounting members and a flexure blade pivot assembly secured to portions of the frame and the drive arm body within the interior base portion of the drive arm body in order to establish a rotational pivot point for the drive arm body with respect to the frame during operation of the device. Specifically, a first mounting member 130 is secured within the internal base portion of drive arm body 122 and includes a generally rectangular plate 132 that extends through the open section defined at the lower portion of rear wall section 124. Plate 132 is secured to a lower surface of frame base plate 106 at a location proximate the securing location for the rear primary flexure. The first mounting member further includes a pair of flexure mounts 134 and 136 that extend from the first mounting member generally perpendicular to each other to receive and secure flexure blades of a flexure blade pivot assembly 150. When the device is fully assembled, flexure mount 134 extends generally horizontally within the interior base portion toward front wall section 123 of the drive arm body, while flexure mount 136 extends generally vertically within the interior base portion toward the drive arm body top surface.

Second mounting member 140 is secured to front wall section 123 of the drive arm body at a location slightly above the open section defined at the lower portion of the front wall section. The second mounting member is further positioned slightly above the first mounting member within the interior base portion of the drive arm body. A pair of flexure mounts 144 and 146 extend from the second mounting member generally perpendicular to each other to receive and secure the flexure blades of the flexure blade pivot assembly. Flexure mount 144 extends generally horizontally within the interior base portion toward rear wall section 124 of the drive arm body, while flexure mount 146 extends generally vertically within the interior base portion toward the base of the drive arm body.

Flexure blade pivot assembly 150 is secured to the first and second mounting members within the interior base portion of the drive arm body and includes first and second resilient flexure blades 152 and 154. The first and second flexure blades are thin and generally rectangular in configuration, with first flexure blade 152 having a greater width than second flexure blade 154 and further including a central opening sufficiently dimensioned to permit the second flexure blade to extend through the first flexure blade.

The first and second flexure blades are secured to the first and second mounting members in substantially perpendicular alignment with each other, with the first flexure blade generally vertically oriented and the second flexure blade generally horizontally oriented within the interior base portion of the drive arm body. A lower longitudinal end of first flexure blade 152 is secured to flexure mount 134 of the first mounting member, while the upper longitudinal end of the first flexure blade is secured to flexure mount 144 of the second mounting member. A first longitudinal end of second flexure blade 154 is secured to flexure mount 136 of the first mounting member, while the second longitudinal end of the second flexure blade is secured to flexure mount 146 of the second mounting member. The securing of the flexure blades to both the frame (via the first mounting member) and the drive arm body (via the second mounting member) as described above establishes a flexible pivot point 155, located at the intersection of flexure blades 152 and 154, to permit rotational movement of the drive arm body with respect to the frame.

Rotational movement of the drive arm body to effect movement of the carriage, and thus the mirror, is achieved via a rotary actuator assembly 160 secured at the base portion of the drive arm body. The rotary actuator depicted in the figures is a voice coil rotary actuator. However, it is noted that any suitable actuator device may be utilized to effect rotation of the drive arm body. The rotary actuator assembly includes a rounded, concave actuator housing 162 that is secured to the bottom surface edges disposed at the front and rear of the drive arm body. When the drive arm body and the actuator assembly are secured to the frame, actuator housing 162 extends below the lower surface of the frame, and a space or gap 165, as shown in FIG. 5, is defined between the drive arm body and the open sections on the sidewalls of the actuator housing. The actuator housing includes some of the voice coil rotary actuator components including actuator field components (e.g., magnets).

The rotary actuator assembly further includes a mount bracket 164 that is secured to selected portions of the frame base plate and the first mounting member such that, when the device is assembled, the mount bracket lies within gap 165 defined between the drive arm body and the actuator housing and a suitable air gap 167 is defined between the mount bracket and the actuator housing (see FIG. 5). Mount bracket 164 includes the remaining components of the voice coil rotary actuator, including voice coils and electrical wiring (not shown) to connect the voice coils with a suitable power supply source (not shown). When a current is applied to the voice coils, selective rotation in the clockwise or counterclockwise direction of the drive arm body about its pivot point 155 is achieved, which in turn drives the carriage in a corresponding linear direction as described below.

Optionally, mechanical stop members are provided on the frame, carriage assembly and/or drive arm assembly to prevent over-travel of the carriage and/or drive arm body during operation of the device. In the embodiment described above and depicted in FIGS. 2–5, stop blocks 170 are disposed along the sidewalls of the drive arm body and secured to the frame via the first mounting member. The stop blocks limit the rotational movements of the drive arm body.

Figure 6:
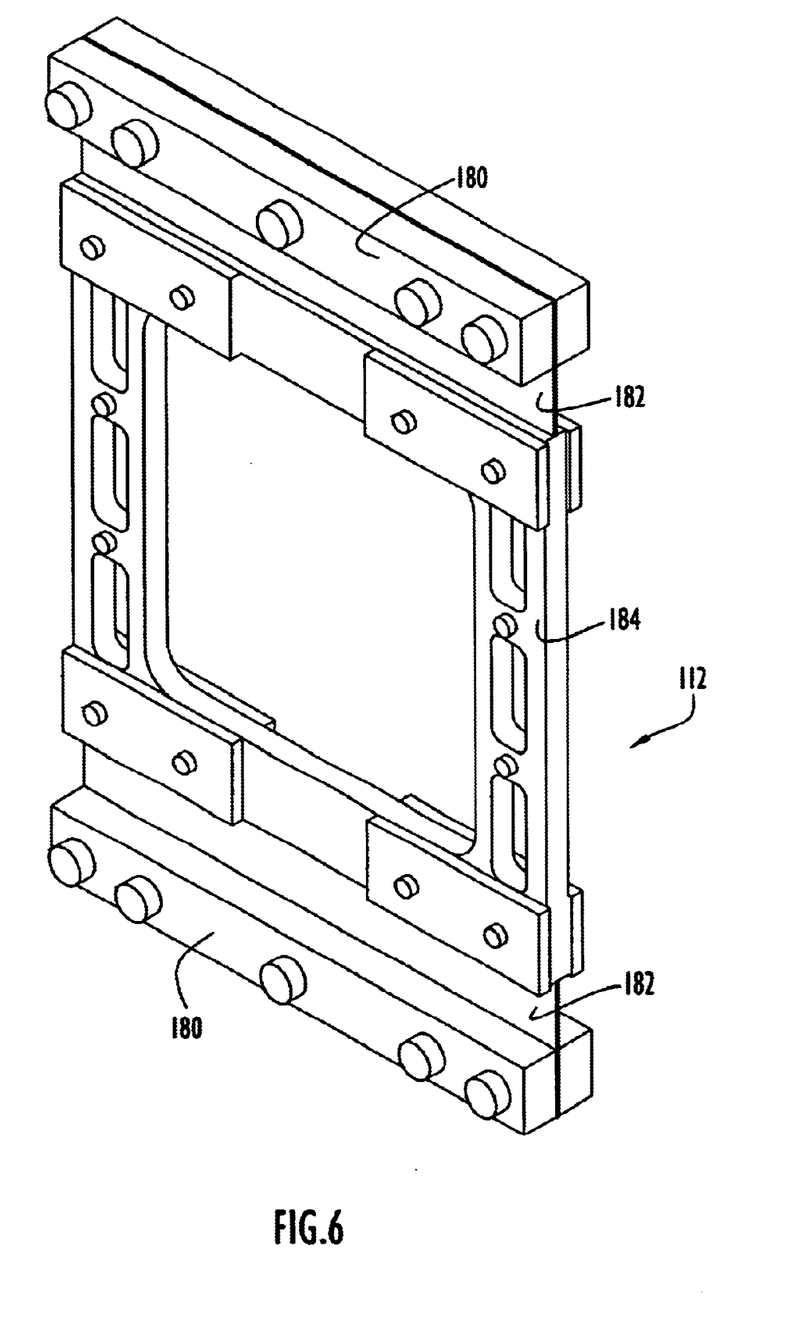
FIG. 6 is a view in perspective of a primary flexure for the device of FIG. 2.

Selection of suitable materials, designs and/or dimensions for the flexures will ensure durability and resistance of the device to thermal and vibrational environments, as well as enhance operation and performance of the device to minimize or eliminate the occurrence of undesirable tilts and/or rotations of the optical component with respect to the frame. Referring to FIG. 6, each primary flexure 112 includes end plates 180, preferably constructed of beryllium, to secure the flexure to the carriage and the frame. Flexure elements 182 are aligned along and extend from a longitudinal surface of each end plate 180. While two flexure elements are connected to each end plate and are separated from each other by a selected distance as depicted in FIG. 6, it is noted that any suitable number of flexure elements (e.g., one) of any one or more selected lengths may be secured to and extend from each end plate. The flexure elements are constructed of a suitable material and have a suitable thickness to satisfy the load and stress requirements necessary for a particular application. For aerospace and other applications, the flexure elements are preferably constructed of 17-7 CH900 stainless steel. Most preferably, the flexure elements have a thickness of about 0.007 inch. A rigid member or stiffener 184, preferably constructed of beryllium, extends between and connects with each of the flexure elements.

The flexure blades of the flexure blade pivot assembly are also preferably constructed of 17-7 CH900 stainless steel. Most preferably, these flexure blades also have a thickness of about 0.007 inch. Clamp plates disposed at the longitudinal ends of the flexure blades for securing to the mounting members are preferably constructed of 17-4 PH stainless steel.

Referring to FIG. 4, drive link flexure 128 includes a flexure element 190 preferably constructed of 17-7 CH900 stainless steel. Most preferably, the flexure element of the drive link flexure has a thickness of about 0.010 inch. Clamp plates 192 are disposed at the longitudinal ends of flexure element 190 for securing the drive link flexure to the carriage and the drive arm body. The clamp plates are preferably constructed of 17-4 PH stainless steel. In addition, at least one of the clamp plates preferably includes a narrowed section that serves as a hinge for the drive link flexure. In the embodiment depicted in the figures, each clamp plate 192 includes a narrowed section 193. Each narrowed section or hinge permits a portion of the drive link flexure disposed on one side of the hinge to pivot about a variety of axes with respect to another portion of the drive link flexure disposed on the other side of the hinge.

Providing one or more narrowed sections in the clamp plates of the drive link flexure provides additional stability and enhances performance of the device by limiting or preventing undesirable rotational or tilting movements to the carriage as a result of the positioning and/or rotational movements of the drive arm with respect to the carriage. For example, if the carriage and drive arm body are not in perfect alignment along the linear axis in which the carriage is to be moved, the carriage may be subjected to one or more forces that are transverse to this linear axis. In applications that require precise positioning and alignment of the optical component (e.g., in an interferometer), any tilt or movement of the optical component other than along the linear axis can be detrimental to operation of the device. The drive link flexure design minimizes or prevents undesired tilting or rotations of the carriage by absorbing any undesirable forces applied by the drive arm body at the narrowed sections, which further obviates the need to precisely align the drive arm with respect to the carriage in order to achieve precision linear translation to the optical component or other object secured to the carriage.

Figure 7A:
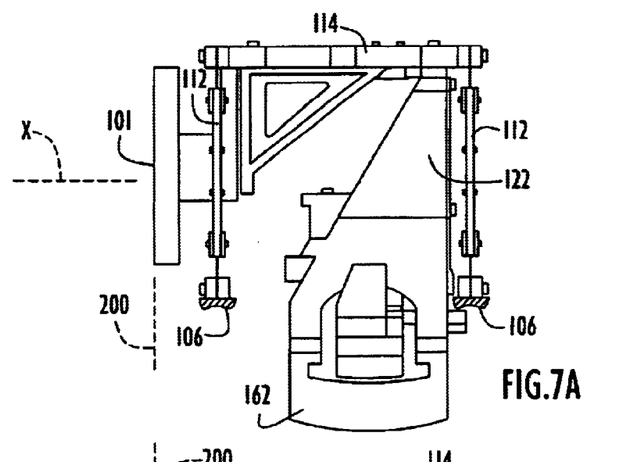
FIGS. 7a–7c are simplified side views in partial cross-section of the device of FIG. 2 showing linear movement of the carriage and optical component during operation of the device.

Operation of linear translation device 100 is described with reference to FIGS. 7a–7c. It is noted that these figures provide simplified views of device 100 in partial cross-section, with only certain portions of the frame, carriage assembly, drive arm assembly and rotary actuator assembly depicted in order to easily illustrate movements of the drive arm body and carriage. In FIG. 7a, drive arm body 122 and carriage assembly 110 are at rest (i.e., the drive arm body is not subjected to rotational movements), and optical component 101 is disposed at a starting or resting position (as indicated by vertical line 200).

Figure 7B:
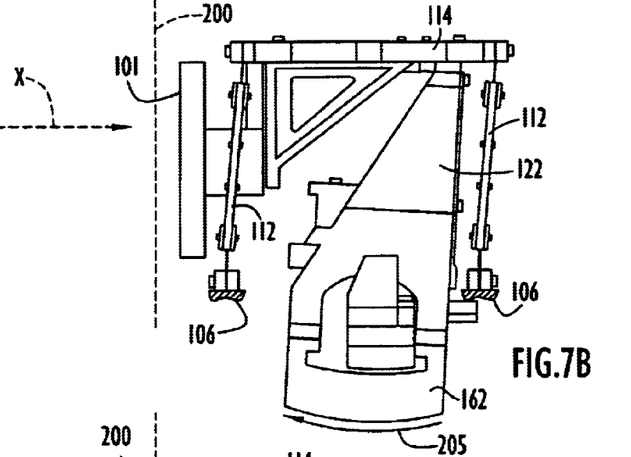
Figure 7C:
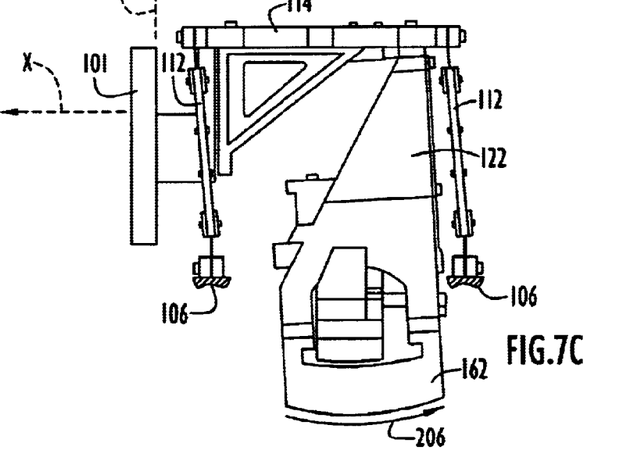

Upon application of a suitable current to the voice coils secured to mount bracket 164 of the rotary actuator assembly, drive arm body 122 and actuator housing 162 rotate in a clockwise direction about rotational pivot point 155, as depicted in FIG. 7b (where arrow 205 indicates the rotational direction), as a result of the magnetic force generated by the current flowing through the voice coils. Such rotation in turn forces drive link flexure 128 to bend or flex slightly in a downward direction toward frame base plate 106, pulling carriage 114 in a direction toward the rear end of the frame. Flexure elements 182 of primary flexures 112 bend slightly in response to the forces transferred by the drive arm body and drive link flexure, resulting in a slight counter-clockwise rotational movement of stiffeners 184 with respect to the frame and a substantially linear movement of the carriage toward the rear end of the frame along a horizontal axis X. The movement of the carriage in turn causes substantially linear movement of optical component 101 in a rear direction along horizontal axis X to a displaced position from its resting position (i.e., vertical dashed line 200). Movement of the carriage and optical component in the opposite direction (i.e., a forward direction), as indicated in FIG. 7c, is similarly achieved by effecting rotation of the drive arm body, via the rotary actuator assembly, in a counter-clockwise direction (as indicated by rotational arrow 206), which causes the drive link flexure to bend or flex slightly upward toward the carriage to translate corresponding linear movement of the carriage and the optical component along horizontal axis X from its resting position (i.e., vertical dashed line 200). It is noted that, while the flexure elements of the primary flexures bend or flex slightly during rotation of the drive arm body, the stiffeners remain substantially rigid, such that the primary flexures remain in substantially parallel alignment with each other as the stiffeners pivot with respect to the frame.

The maximum linear distances at which the optical component can be moved from its resting position with respect to the frame can be controlled by controlling certain design features of the device, such as dimensions of certain device components, selection of resilient materials for certain flexure components, providing mechanical stops to prevent over-travel of the carriage and/or drive arm body, etc.

The flexure design for the primary flexures, drive link flexure and flexure blade pivot assembly enable the device to effectively transfer the rotary motion of the drive arm body to a substantially linear motion for the carriage and optical component mounted to the carriage. The flexures further provide pivotable linkages that are frictionless and durable, thus obviating the need for mechanical linkages and bearings that are undesirable for aerospace and other applications in which an extended operational life is required.

Other benefits are also achieved utilizing the linear translation mechanism design of the present invention. For example, in addition to imparting linear movement to the carriage and optical component, it is noted that the drive arm body and actuator housing further serve as a counterweight to balance or control the center of gravity of the device during operation. Thus, combining part of the actuator with the counterweight to form a single component (i.e., the drive arm body) reduces the weight and dimensions of the device, which in turn reduces the power requirements necessary to operate the device, in comparison to other linear translation mechanism designs in which an actuator and counterweight are provided as separate components. Further, positioning of the voice coils of the rotary actuator assembly at a location under the frame allows for easy removal of heat generated by the coils from the device during operation, thus minimizing the potential for heat transfer to other components of the device. In essence, the combination of all the above noted features, including the drive arm body and actuator housing also serving as a counterweight, the use of the varying types of flexures for securing the carriage, frame and drive arm body to each other, the location of the actuator voice coils, the choice of materials of construction with the same or similar CTE, etc., result in a precision frictionless linear translation device that delivers high precision linear motion to the carriage and component attached to the carriage with reduced power requirements and optimized transfer of heat generated by the actuator from the frame.

It will be appreciated that the embodiments described above and illustrated in the drawings represent only a few of the many ways of implementing a precision frictionless flexure based linear translation mechanism insensitive to thermal and vibrational environments in accordance with the present invention. For example, drive arm body may be secured at any suitable location to the carriage. Rather than being secured near the front end of the carriage as described above and illustrated in the figures, the orientation of the drive arm body may instead be reversed such that it secures, via the drive link flexure, to a rear portion of the carriage.

The dimensions, configurations and materials of construction of any of the previously described components may be of any suitable size and type to render the device suitable to translate rotational motion of the drive arm body to a linear motion of the object secured to the carriage assembly. In addition, the rotary actuator device may be any suitable electromechanical rotary motor that effects rotational motions of the drive arm assembly.

Any suitable number of primary flexures, flexures for the flexure blade pivot assembly and/or drive link flexures may be provided to translate the rotational motion of the drive arm body to a linear motion of the object as described above. For example, the flexure blade pivot assembly may include a single flexure configured to establish a pivot point for the drive arm body with respect to the frame.

Further, the device of the present invention is not limited to optical devices and/or aerospace applications. Rather, the device may be utilized in any device or system requiring precise linear movements of a component, particularly in environments with thermal and/or vibrational distortion considerations. For example, the device of the present invention has applications for controlling precise movements of optical and/or other components in the semiconductor manufacturing and related industries.

Having described preferred embodiments of a precision frictionless flexure based linear translation mechanism insensitive to thermal and vibrational environments, variations and changes will be suggested to those skilled in the art in view of the teachings set forth herein. It is therefore to be understood that all such variations, modifications and changes are believed to fall within the scope of the present invention as defined by the appended claims.

What is claimed:

1. A linear translation device comprising:
   a frame;
   a carriage pivotally coupled to the frame;
   a drive arm body coupled to the carriage and rotatably coupled to the frame; and
   an actuator coupled to the drive arm body and the frame to effect rotation of the drive arm body about a pivot point;
   wherein a linear motion of the carriage is achieved upon rotation of the drive arm body by the actuator about the pivot point.

2. The device of claim 1, wherein the carriage is coupled to the frame via flexures that pivot with respect to the frame in response to rotation of the drive arm body.

3. The device of claim 2, wherein the flexures are in substantially parallel alignment with each other and remain in substantially parallel alignment as the flexures pivot with respect to the frame.

4. The device of claim 1, wherein the drive arm body is rotatably coupled to the frame via a pivot link comprising at least one flexure that flexes during rotation of the drive arm body.

5. The device of claim 4, wherein the at least one flexure of the pivot link includes first and second flexures that intersect and are substantially perpendicular to each other, each flexure of the pivot link being secured at one flexure end to the drive arm body and at another flexure end to the frame such that the pivot point is located at an intersection point of the first and second flexures.

6. The device of claim 1, wherein the drive arm body is coupled to the carriage via a drive link comprising a flexure that flexes when the drive arm body is rotated by the actuator.

7. The device of claim 6, wherein the drive link includes at least one narrowed section that separates the drive link into two portions, with each portion being independently pivotable with respect to the other portion.

8. The device of claim 1, wherein the actuator comprises a voice coil actuator.

9. The device of claim 8, wherein the voice coil actuator includes a magnet housing secured to the drive arm body and a coil member secured to the frame.

10. The device of claim 1, wherein each of the frame, carriage and drive arm are coupled to each other via flexures.

11. The device of claim 1, wherein the carriage includes a support to connect an object to the carriage such that linear motion is conveyed to the object by the carriage in response to rotation of the drive arm body by the actuator about the pivot point.

12. The device of claim 1, wherein the object comprises an optical component.

13. An optical instrument comprising the linear translation device of claim 12.

14. An interferometer comprising the linear translation device of claim 12.

15. A method of moving an object in a substantially linear direction utilizing a linear translation device, the linear translation device including a frame, a carriage pivotally coupled to the frame, a drive arm body coupled to the carriage and rotatably coupled to the frame, and an actuator coupled to the drive arm body and the frame, the method comprising:
   (a) securing the object to the carriage;
   (b) rotating the drive arm body about a pivot point with respect to the frame via the actuator; and
   (c) facilitating a linear movement of the carriage and the object connected to the carriage in response to rotation of the drive arm body about the pivot point.

16. The method of claim 15, wherein the carriage is pivotally coupled to the frame via flexures that are in substantially parallel alignment with each other, and (c) includes:
   (c.1) facilitating pivotal movement of the flexures with respect to the frame in response to rotation of the drive arm body about the pivot point.

17. The method of claim 16, wherein the flexures maintain their substantially parallel alignment with each other during their pivotal movement.

18. The method of claim 15, wherein the drive arm body is rotatably coupled to the frame via a pivot link including at least one flexure that flexes during rotation of the drive arm body.

19. The method of claim 18, wherein the at least one flexure of the pivot link includes first and second flexures that intersect and are substantially perpendicular to each other, each flexure of the pivot link being secured at one flexure end to the drive arm body and at another flexure end to the frame such that the pivot point is located at an intersection point of the first and second flexures.

20. The method of claim 15, wherein the drive arm body is coupled to the carriage via a drive link comprising a flexure, and (c) includes:
   (c. 1) flexing the flexure of the drive link during rotation of the drive arm body.

21. The method of claim 20, wherein the drive link includes at least one narrowed section that separates the drive link into a first portion and a second portion, and the method further comprises:
   (d) facilitating independent pivotal movements of at least one of the first and second portions of the drive link with respect to the other of the first and second portions at the narrowed section to substantially limit movements of the carriage and object secured to the carriage to linear movements with respect to a single axis.

22. The method of claim 15, wherein the actuator comprises a voice coil actuator including a magnet housing secured to the drive arm body and a coil member secured to the frame, and (b) includes:

(b.1) applying a current to the coil member to achieve a selected degree of rotation of the drive arm body about the pivot point with respect to the frame.

23. The method of claim 15, wherein each of the frame, carriage and drive arm are coupled to each other via flexures.

24. The method of claim 15, wherein the object comprises an optical component.

25. The method of claim 24, wherein the linear translation device forms at least a part of an optical instrument.

26. The method of claim 25, wherein the optical instrument is an interferometer.

27. A linear translation device for transferring a linear motion to an object comprising:

a frame;

a means for supporting the object, the means for supporting being pivotally coupled to the frame;

a means for driving the means for supporting, the means for driving being rotatably coupled to the frame; and a means for actuating the means for driving by selectively rotating the means for driving about a pivot point with respect to frame;

wherein a linear motion of the means for supporting is achieved upon rotation about the pivot point of the means for driving.

* * * * *